(12) United States Patent
Kean

(10) Patent No.: US 8,063,739 B2
(45) Date of Patent: Nov. 22, 2011

(54) METHOD OF ACTIVELY TAGGING ELECTRONIC DESIGNS AND INTELLECTUAL PROPERTY CORES

(75) Inventor: Thomas A. Kean, Edinburgh (GB)

(73) Assignee: Algotronix, Ltd., Edinburg, Scotland (GB)

( * ) Notice: Subject to any disclaimer, the term of this patent is extended or adjusted under 35 U.S.C. 154(b) by 1021 days.

(21) Appl. No.: 11/852,205

(22) Filed: Sep. 7, 2007

(65) Prior Publication Data
US 2008/0061980 A1 Mar. 13, 2008

(30) Foreign Application Priority Data

Sep. 8, 2006 (GB) .................................. 0617697.8

(51) Int. Cl.
*H04Q 5/22* (2006.01)
(52) U.S. Cl. .................. 340/10.1; 340/572.4; 340/572.8
(58) Field of Classification Search .................. 340/10.1, 340/12.33, 13.24, 505, 572.4, 572.8
See application file for complete search history.

(56) References Cited

U.S. PATENT DOCUMENTS

| 6,838,989 | B1 * | 1/2005 | Mays et al. ................. 340/572.1 |
| 6,963,289 | B2 * | 11/2005 | Aljadeff et al. .......... 340/825.49 |
| 7,348,887 | B1 * | 3/2008 | Warner et al. .............. 340/572.3 |
| 7,692,544 | B2 * | 4/2010 | Hiraiwa et al. ............ 340/572.1 |
| 2004/0230925 | A1 | 11/2004 | Tsao et al. |
| 2005/0280511 | A1 * | 12/2005 | Yokoyama et al. .......... 340/10.5 |

FOREIGN PATENT DOCUMENTS

JP 2005057203 A 8/2003

* cited by examiner

*Primary Examiner* — Vernal Brown
(74) *Attorney, Agent, or Firm* — Orrick, Herrington & Sutcliffe LLP

(57) ABSTRACT

An active security tag is embedded within the digital logic of an electronic design for logic destined for an integrated circuit such as an FPGA. The security tag includes security tag data which permits identification of the electronic design, and facilitates efforts to enforce copyrights in the designs. The security tag also includes a transmitter designed to covertly transmit security tag data to a receiver. Other information, such as error information and status information about the integrated circuit may also be transmitted. The transmitted information is concealed from detection by being hidden within background noise signals or other signals created by normal usage of the integrated circuit.

4 Claims, 2 Drawing Sheets

METHOD OF ACTIVELY TAGGING ELECTRONIC DESIGNS AND INTELLECTUAL PROPERTY CORES

This application claims the benefit of United Kingdom Patent Application Serial No. GB 0617697.8, titled "Method of Actively Tagging Electronic Designs and Intellectual Property Cores", filed Sep. 8, 2006.

FIELD OF THE INVENTION

This invention relates to the labelling and protection of electronic design information, particularly electronic design fragments that are sold as Intellectual Property Cores (IP Cores) to be incorporated in larger customer designs.

BACKGROUND OF THE INVENTION

Unscrupulous equipment manufacturers may abuse the intellectual property rights of designers by making use of their designs without permission. Examples of such illegal activity include:
1. Copying FPGA bitstream information from a competitor's product and using it to configure the same kind of FPGA in one's own product.
2. When using a design under license, making more units of the design than the licensing agreement and fees paid would allow (overbuilding).
3. Obtaining design information through fraudulent methods or through reverse engineering and making use of the design without paying any required fees.

Design information may relate to designs which are to be implemented on Field Programmable Gate Arrays or designs which are to be implemented directly as integrated circuits.

A problem faced by owners of such design information, seeking to police abuse of their intellectual property rights, is that it is costly and time consuming to determine whether a particular product does in fact contain the proprietary design fragment. In the case of silicon chips the only practical method is to obtain a sample of the product under suspicion and send it to a specialist laboratory for analysis and reverse engineering. In the case of FPGA designs where the bitstream is encrypted or programmed into antifuse FPGAs, where the state of the anti-fuses is almost impossible to determine even by microscopic analysis, the difficulty of obtaining evidence of wrongdoing is even greater.

As well as allowing the detection of illegal use, the ability to label design components will have other benefits in the area of quality assurance and failure analysis. Modern electronic systems such as personal computers contain hundreds of integrated circuits from tens of IC vendors. Each of these integrated circuit chips is likely to be improved from time to time resulting in different versions of the chip being sold at different times. Some chips may be available from more than one vendor. Some complex 'System on Chip' devices may contain IP Cores which themselves are updated from time to time, so different versions of the IP may be present in different chips. The system may contain programmable FPGA chips whose functionality can be changed by downloading a new bitstream while the system is in the field. When FPGA chips are used the configuration of the system is not necessarily fixed at the time of manufacture.

When a system fails in the field it is important for the service engineer or technical support person to be able to determine the 'version' of the system and key components within it which has failed. The most practical way of doing this at the present time is to 'open the lid' take out the board and examine the top of the package of any suspect chips. Chip packages are usually printed with the part number and a code which can be used to identify the design version and date of manufacture. This system is not perfect because chip packages are becoming smaller, which limits the amount of information that can be printed. Some package materials do not lend themselves to legible printing. Also, marketing people would prefer to use the available space for company logos rather than long product identification codes. In some cases companies deliberately remove markings or ask for unmarked devices in order to make it difficult for competitors to determine which chips have been used in their system. At a practical level it can be difficult to decipher the markings on the top of chip packages. With programmable chips such as FPGAs the labelling on the chip package does not identify the design which has been programmed into the chip.

The industry around licensing IP Cores is still relatively young so there has been little work specifically on detecting the use of IP cores within a larger design. However, several companies offer 'reverse engineering' services where they analyse integrated circuit chips to determine the circuits which have been implemented on them. These services are used for competitive analysis purposes and also to provide evidence of patent infringement. Reverse Engineering services could be used to provide evidence of improper use of an IP core within an integrated circuit.

In the context of FPGAs 'passive' techniques which use analysis of bitstream or other design files have been proposed to detect unauthorised use of design intellectual property. In most cases analysis to detect the presence of an IP Core is based on obtaining a product containing the suspect FPGA. Normally there will be no access to files from the CAD tools used in the FPGA design process, except the final bitstream. In the case where the bitstream cannot be recovered because it is encrypted or programmed into an antifuse or FLASH based FPGA bitstream, analysis techniques would be useless. Conventional reverse engineering services which conduct an analysis of the physical interconnects on the integrated circuit are also of no help in the FPGA case, because the IP core design cannot be determined by analysing the mask work of the FPGA it is configured into.

In the context of ASIC chips it is common practice to include markings within the mask work for the top metal layers which can be read by the naked eye or through a microscope. These markings often contain company logos, copyright messages and revision data for the masks used to fabricate the design. Sometimes smaller copyright messages are hidden within the maskwork in the hope that a pirate who copies the mask will not notice their presence and remove them and that they can then be used as evidence of copyright infringement.

There is, therefore, a need for a method which can produce an inventory of the chips used in a system, including design version and manufacturing batch information. Such a method should ideally be fast, easy to use, be able to operate without disassembling the equipment containing the chips, require no new pins on the chip packages and work with designs programmed into FPGA chips as well as designs manufactured directly in silicon.

SUMMARY OF THE INVENTION

In one novel aspect of an embodiment of this invention an active 'tag' circuit is provided whose presence within an integrated circuit or FPGA can easily and cost-effectively be determined. Unlike prior-art passive tags which are detected by optical inspection of integrated circuit artwork or analysis of FPGA bitstream files the active tag is an operational circuit which creates a signal which is then detected off chip. Thus the functionality of an active tag is independent of the bitstream file format or the memory technology used to store FPGA configuration data and is equally applicable to conventional non-programmable chips.

Advantages of this method of securing intellectual property include:
1. IP core vendors do not have to undertake costly and time consuming physical analysis of IC chips to determine if their intellectual property has been included within them.
2. In the case of FPGA chips, the presence of IP cores can be detected even when the FPGA bitstream is encrypted.
3. It is difficult for illegal users of IP cores to detect and remove the tagging component.

Further objects and advantages of the invention will become apparent from a consideration of the drawings and ensuing description.

DETAILED DESCRIPTION OF THE INVENTION

Figure 1:
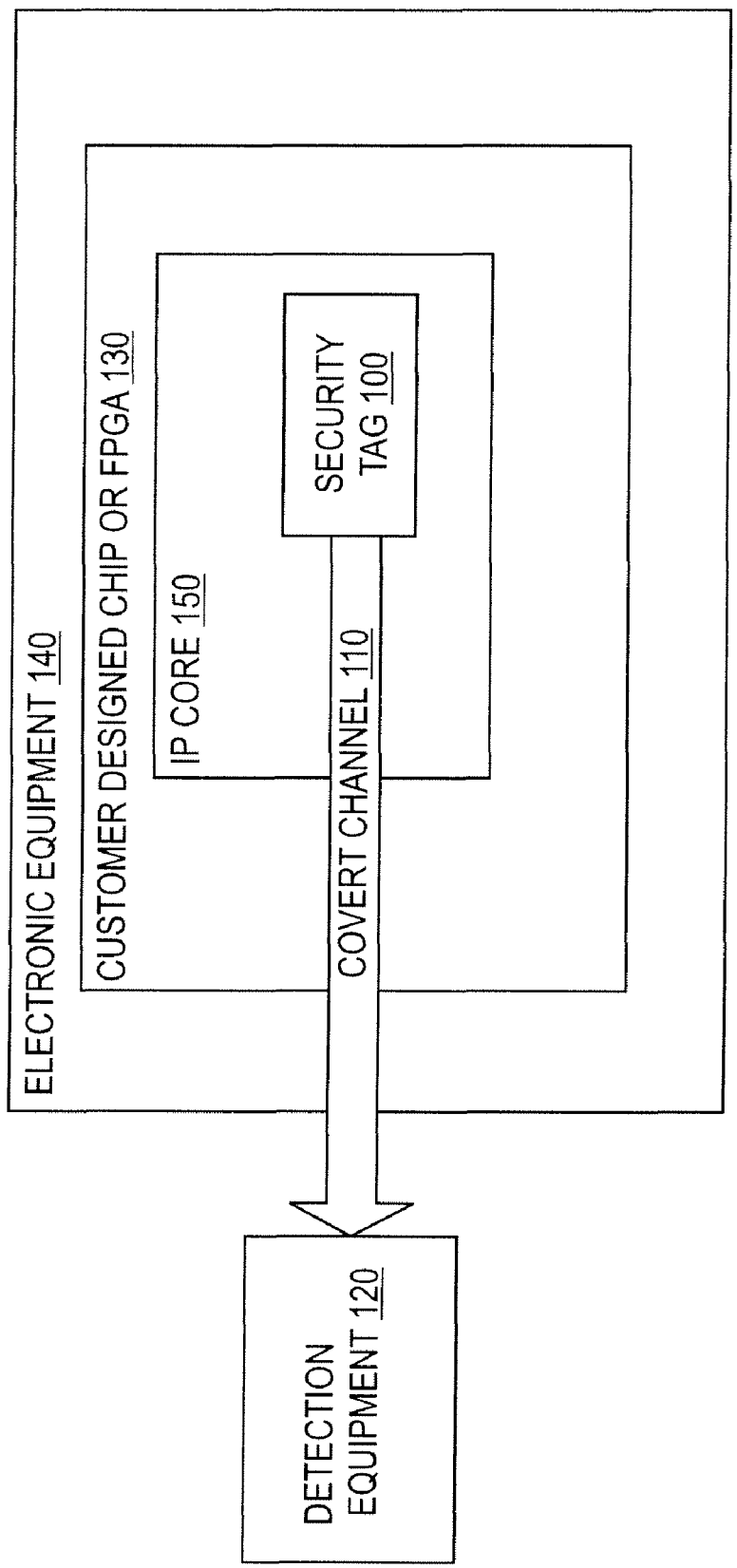
FIG. 1 shows the basic principle of the active tag of an embodiment of the invention.

Turning to FIG. 1, in one novel aspect of an embodiment of the invention a security tag design fragment 100 is disclosed, which creates a covert channel 110 between itself and detection equipment 120 located outside an integrated circuit 130. This integrated circuit 130, containing the security tag 100, is then incorporated in a piece of electronic equipment 140. By connecting detection equipment 120 to the electronic equipment 140, (or in some cases merely positioning a sensor from the detection equipment 120 near the electronic equipment 140) the security tag 100 creates a covert communications channel 110 between itself and the detection equipment 120, which allows the detection equipment 120 to determine that the security tag 100 is present.

Although the security tag 100 is shown in FIG. 1 as being added to an IP core 150, by the IP core vendor, a designer of a complete chip (rather than an IP core 150 design fragment) could also use a security tag 100 on the chip 130 to protect their own intellectual property rights. In another scenario a vendor of Electronic CAD tools might program their tools to add a security tag 100 to any chip created using the tools. This would allow the vendor to determine if any commercial chips had been created using unlicensed or academic versions of the software. Piracy and misuse of expensive CAD tools is widespread in poorer countries which are trying to build up an electronic design infrastructure.

Preferably the security tag 100 should have the following properties:
1. The tag should not require special silicon processing, excessive silicon area or excessive power consumption. It is desirable that the security tag has minimal impact on the cost of the system.
2. It should be hard for a malevolent party to disable the tag. Analogously to a tag used to protect clothing in a shop, in order to be effective a security tag for intellectual property should be difficult to remove or disable. One way of achieving this is to make the tag difficult to find. As well as protecting the tag, it is also important to protect the communication channel between the tag and the detection equipment from disruption.
3. The tag should uniquely identify the piece of IP it is protecting. If security tags become commonplace there could be several of them within a particular piece of electronic equipment. Therefore it is advantageous if the tag can uniquely identify the piece of IP it is protecting rather than just announcing that there is a tag somewhere within the system.
4. Detection of the tag should be a completely reliable indication of its presence. Since the tag is intended to provide legal evidence of the presence of a particular piece of IP it is important that the detection equipment is highly unlikely to detect the tag incorrectly when it is not in fact present.

In an alternative embodiment of the invention, rather than inserting a special security tag 100 into the design to be protected, aspects of the activity of the design itself which can be detected off chip are used to confirm the design's presence. These aspects of the activity of the design act as a de facto security tag 100.

Figure 2:
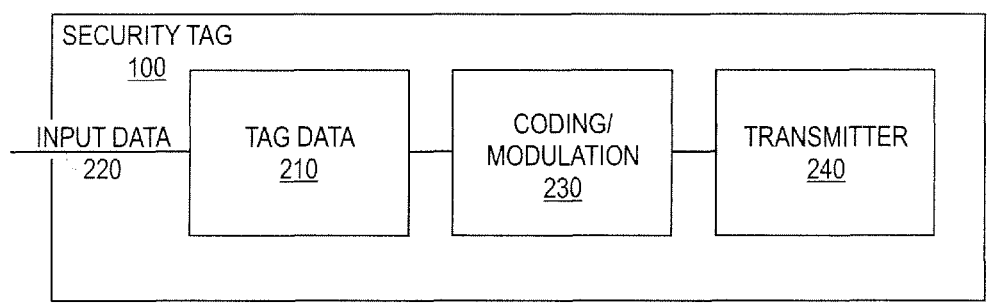
FIG. 2 shows a more detailed block diagram of an active tag of an embodiment of the invention.

FIG. 2 shows a generic security tag 100. The security tag 100 contains tag data 210 which uniquely identifies the product being tagged. Unique numbering schemes for product labelling are known in the art—for example bar codes are widely used in industry and Radio Frequency ID (RFID) chip tags are becoming more common. Rather than create a new numbering scheme for the security tag 100 it may well be better to create tag data 210 using one of these existing standards. From a physical implementation point of view the actual numbering scheme is not important—the tag data 210 is just a binary number. For example, tag data 210 might be a 128 bit integer assigned to a tag user by the company which provides the security tag 100.

In an aspect of an embodiment of the invention, a connection 220, 'Input Data' is shown to the tag data box 210 to allow the security tag 100 to transmit status information from other circuitry on the chip as well as the tag identification data 210.

In another novel aspect of an embodiment of the invention, this 'input data' connection facility 220 on the security tag circuit 100 can be used to allow the chip to communicate error information to detection equipment. Many chips in an electronic system and particularly IP core subsystems within larger chip have no way of communicating error information through their normal interface signals. Thus even if a chip or an IP core within a chip detects a fault condition it cannot communicate this to the larger system or to a service engineer. The number of pins or the chip package is usually severely limited and there is no reasonable standardised way to collect together error signals from many chips at the system level. The ability to transmit error information using a standard protocol through the power supply wiring in a secure form would greatly simplify failure analysis of complex electronic systems. When this is done using the secure communications channel created by the IP security tag 100 the designer of the core can also be confident that error information from its product will only be available to its own engineers.

The coding/modulation box 230 is responsible for taking the basic information to be transmitted, provided by the tag data unit 210, and coding it up into a form more suitable for transmission. Some transmission methods may involve modulating the coded data onto a carrier signal. The transmitter 240 is responsible for causing some effect which can be detected off the chip and can be used to signal information. Many possible physical effects could be used, for example, temperature variations, voltage variations on the power supply, radio waves or modulation of the transition times of data signals from the main operating circuitry of the chip. In general, any physical effect caused by on chip circuitry which can be detected off chip could be used to signal information. Subsequent sections of this application will consider particular effects which are presently considered to be preferred for this purpose.

The tag application 100 only requires a very small amount of information to be communicated (less than 1 k byte) and it does not require high speed communication (a speed of 1 k byte/second) would be quite acceptable. Furthermore, the transmission range is very low (a few centimeters) and in some cases a direct wired connection is possible. This is a very much easier task than that faced by most wired or wireless data communications equipment—for example, cellular phones, Bluetooth, IEEE 802.11, wireless local area network or ADSL. In an embodiment, the unique constraint of the tag application 100 is that (although the receiver may be relatively complex and expensive) the transmitter 240 must be very simple and, in the case of an FPGA use only standard digital logic. A second issue is that as well as normal concerns about noise there is a possibility of a nefarious party employing active countermeasures to disrupt the channel between the tag and the receiver.

IP Tagging Using Power Analysis

By connecting test equipment to the power pins of an integrated circuit (or traces on the printed circuit board adjacent to the power pins) one can measure small changes in the voltage caused by variations in the current drawn by circuits on the chip. This technique has been studied in the cryptographic literature as a 'side channel' through which information about cryptographic keys might 'leak' from a chip such as a smartcard which carries out a cryptographic function. In the cryptographic context this is considered undesirable and considerable research effort has gone into ways of reducing or mitigating this effect.

In a presently preferred embodiment of this invention it is proposed that a 'security tag' 100 design fragment be produced which quite deliberately modulates its power supply requirement in such a way as to covertly transmit a distinctive signal to detection equipment 120 connected to the power pins of the integrated circuit or to the power bus in the system which contains the integrated circuit. These power pins or power bus provide the covert communications channel 110 shown in FIG. 1. Should the external detection equipment 120 detect such a signal then the user can be sure that a security tag 100 is present within the chip 130 and therefore that the Intellectual Property to which the security tag 100 was added is also present. If the manufacturer of the chip does not have a license to use the intellectual property then this is evidence that the intellectual property is being used illegally.

The design considerations for the timing circuit used to generate timing signals for the security tag 100 depend to some extent on whether the tag 100 is designed for use to protect an IP core 150 or a chip level system 130. If the user of the security tag 100 designs the whole chip 130 then they have control of the system clock within the chip 130 and it may be reasonable to use the system clock to generate timing signals for the security tag 100, although there is a chance that the system clock will be interfered with at the board level.

When the security tag 100 is added to an IP core 150, on the other hand, the system clock frequency is not directly controlled by the IP core designer and there is a possibility of the system clock being gated (disabled) when the IP core function is not required. Thus relying on the system clock for correct operation of the security tag 100 is less desirable.

For these reasons, in a preferred embodiment timing for the IP tag 100 is derived from a ring oscillator so that it is not dependent on the system clock frequency. This has the added benefit that the frequency at which the tag's signal is transmitted is under the direct control of the tag designer and is known in advance (instead of being a function of the system clock).

Most of the noise on the power supply lines of the chip 150 will be at the system clock frequency (caused by the power drawn by the buffers which distribute the system clock throughout the chip 150), the first few major harmonics of the system clock frequency (since the system clock is ideally a square wave frequency, components higher than the base frequency must be present) and fractions of the system clock frequency (since many data and enable signals will change at a fraction of the system clock).

The challenge facing the security tag designer is that the security tag is 100 a very small part of the overall design. Therefore, almost all signal transitions inside the IP core 150 or chip 130 are within circuits unrelated to the security tag 100. Each transition results in noise on the power supply lines (which are the covert channel 110 in this embodiment). Transitions on heavily loaded signals such as external I/O pins and clock drivers will cause much larger noise voltages than those on small transistors driving short range signals. Power supply noise is considered undesirable since it affects the performance of the integrated circuit 130 and in extreme cases can cause it to fail. Therefore it is standard practice to place capacitors to filter transients on the power supply close to the pins of the chip 130. Within the chip 130 the capacitance of the power supply distribution network also has a filtering effect and it is becoming more common to include 'designed' on chip capacitance. The challenge is to detect the signal from the security tag 100 in the presence of the interfering signals and despite the attenuation from smoothing capacitors.

One way to make the signal from the security tag 100 more easily detectable is to increase the power of the transmitter 240. This would involve creating a larger signal voltage on the power supply lines within the chip 130. One way of creating a signal voltage on the power supply lines is to directly short power to ground for a short period through a large pass transistor controlled by the signal. Another method is to connect the signal to a large buffer which drives a heavy capacitive load. In the case of a security tag 100 to be incorporated in a design implemented on an FPGA it is necessary to work with the circuit primitives offered by the FPGA chip. In some devices it is possible to create a 'contention' condition in which several long line drivers attempt to force the long line to different values—this is equivalent to the simple circuit where power is shorted to ground through two pass transistors. Long lines have higher capacitive load and larger drivers than most signals on the FPGA and driving long lines with the signal to be transmitted can be expected to cause larger effects to the power supply voltage. It would also be possible to connect the signal to a global clock buffer or a net with high fanout.

It is desirable for the security tag 100 to operate with the smallest possible transmit power which allows for reliable reception of the signal. There are several reasons for this:

1. Large transients on the on-chip power supply wiring can cause incorrect operation.
2. Large power consumption in the security tag is 100 undesirable and particularly high currents may lead to reliability problems.
3. Large signals make the presence of the security tag 100 more obvious.

Given that it is not feasible or desirable to simply increase the transmit power to the point where the signal from the tag 100 dominates noise signals on the power supply wiring it is clear that the receiver in the detection equipment 120 faces the problem of distinguishing a small signal from within much larger noise. This is exactly the same problem faced by radio receivers and approaches developed for digital radio receivers in equipment like cellular phones can be applied to this problem:

1. Selection and Amplification. The amplitude of the wanted signal will be very small—perhaps only a few microvolts. In order to process the signal further it is necessary to amplify it. However, the noise voltage may be a few tenths of a volt—100,000 times larger. It is necessary to filter out as much as possible of the noise before applying amplification, otherwise the amplified noise voltage will saturate the amplifier and the signal will be lost altogether.
2. Mixing. Mixing with a carrier frequency is commonly used in radio communications to change the frequency band at which a signal is present.
3. Coding Gain. This refers to techniques such as Code Division Multiple Access (CDMA) which result in an apparent amplification of the signal as a result of digital signal processing.
4. Frequency Hopping. This refers to a technique in which the transmit frequency is changed from time to time according to a pattern which is known to the receiver in the detection equipment 120 but not unauthorised eavesdroppers or parties trying to 'jam' the transmission. Frequency hopping makes the signal from the security tag 100 more resistant to interference from other circuitry within the chip 130 whether malicious or a consequence of normal operation. Frequency hopping can also provide a means of mitigating interference from other security tags within the system.

Previous work in the cryptographic literature on extracting information from power supply variations has relied on statistical techniques such as Differential Power Analysis to detect patterns in the data. These statistical techniques can also be looked on as a form of coding gain, as noted above. In the cryptographic literature the circuitry which creates the information on the power supplies is not designed by the person who wishes to receive the information—in fact the two are adversaries, the goal of the chip designer is to prevent information leaking on the power supply.

In the case of a security tag 100 the designer of the transmit circuitry 240 will wish to make the receiver's job as easy as possible. In one simple embodiment, to allow selection and amplification the frequency at which the security tag 100 transmits, the frequency of the transmitted signal is chosen to be widely separated from the frequency of potential interfering signals. A drawback of this approach is that it makes the presence of the core possible to detect by an attacker using standard test equipment such as a spectrum analyser. For this reason, in another embodiment the frequency of operation of the security tag signal within the core is chosen to lie within that of interfering signals in an attempt to 'hide' the tag signal within the background noise. In this case more sophisticated schemes will be necessary to allow for detection of the tag signal.

In an embodiment, the data from the security tag 100 is coded using Code Division Multiple Access (CDMA) techniques to produce a signal for transmission. CDMA is a technology widely deployed in the cellular phone industry. CDMA has several benefits: it provides additional coding gain to separate signal from noise in the receiver, it provides a method to allow several tags to simultaneously transmit data in the same frequency band without blocking each other's signal and it makes the signal from the tag appear like noise to parties other than the intended receiver.

It will be appreciated that there is a tradeoff between the complexity (and hence the cost) of the transmit and receive circuitry, the difficulty of detecting its presence and the robustness of the channel to noise and deliberate 'jamming'. The best solution will depend on commercial judgement about the sophistication of likely attackers and the acceptable cost of the tag circuit 100.

Figure 3:
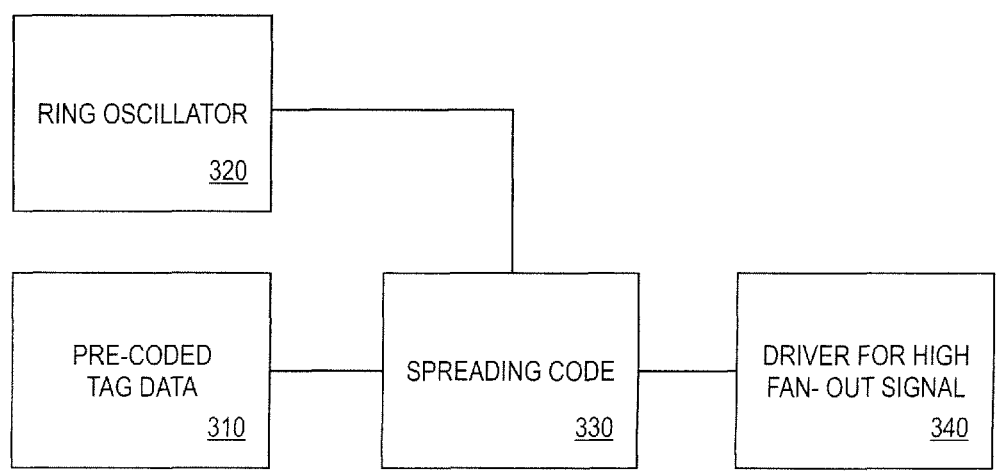
FIG. 3 shows an embodiment of an active tag which communicates by modulating the power supply voltage.

FIG. 3 shows an embodiment of a security tag 100 which uses the power supply as a covert channel 110. Since the tag data 310 does not change in this example, instead of incorporating a coding circuit within the chip to calculate an error correcting code based on the tag data 310, the coded data 310 can be calculated in advance and the coded tag data 310 is stored in the security tag 100 on the chip 130. A ring oscillator 320 is used to develop a carrier frequency and clock the spreading circuitry 330 which 'spreads' the data signal using a spreading code such as those used in CDMA cellular phones. Finally, the spread-spectrum signal is connected to drive a high fan out net 340. The capacitive loading on this net 340 ensures that each transition of the net 340 will draw sufficient current to cause a small disturbance to the voltage on the chip power supply rails, which form the covert channel 110. By measuring the 'noise' on the power supply rail outside the chip 130 and using its knowledge of the spreading codes to collect together and separate the signal information from the background noise the receiver circuit within the detection equipment 120 can reconstruct the original tag signal from the security tag 100.

IP Tagging Using EMC Analysis

It is well known that modern chips operating at high clock frequencies radiate radio signals. Normally, these radio signals are considered undesirable and designers attempt to minimise them since they can potentially interfere with radio communications or other circuits within the system. For example, the metal cases of personal computers (and many other items of electronic equipment) are designed to act as a shield to stop these radio signals escaping. This subject is referred to as Electro-magnetic Compatibility (EMC), the undesired radio signals are themselves referred to as Electromagnetic Interference (EMI).

These unintended emissions have been used for practical purposes before. For example, in the United Kingdom television licensing regulations are enforced by 'detector vans' which patrol the streets and can detect the EMI emitted by television sets in nearby buildings. If a television is detected in a building for which no television license has been purchased then officers have reason to believe that it is being operated illegally. Another example is the use of EMI leaking from computer monitors by intelligence services to determine the information currently being displayed on the screens. To prevent this espionage there is a defence standard called TEMPEST which specifies methods of ensuring that EMI does not leak from sensitive equipment.

UK Patent 2,330,924 describes a system for enforcing software licensing in which software programs running on a PC display a particular pattern on the PC's monitor. This pattern results in a characteristic EMI signal being transmitted which can be detected by a van in the street. The idea is that software companies could keep a database of their customer's addresses and when a detector van discovered their program in use at an unlicensed address then they could attempt to get a court order to search the premises.

The voltages required to create an image on Cathode Ray Tube (CRT) based television sets and computer monitors reach several thousand volts and therefore the level of EMI is massively greater than that in the tiny low power circuits of an individual integrated circuit. Moreover the characteristics of the signal corresponding to an image on a monitor are repetitive (once per frame) and information changes relatively slowly (since it is intended to be read by a human)—both these characteristics simplify the task of processing the received signal.

Detecting EMI from an individual integrated circuit is a much more difficult problem than detecting EMI from a CRT display. The power of radio signals falls off quickly with distance from the source of the signals (the actual rate of fall off depends on the frequency of the signals and the surrounding environment but it is at least quadratic with distance). Thus the distance at which low power signals can be detected is much shorter. Preferably, in this embodiment the detection equipment 120 will include an antenna which receives the EMI signals comprising the covert channel 110 from the security tag 100. This antenna within the detection equipment 120 will be held within the electronic equipment 140 box and close to the chip 130 of interest. Increasing the range at which detection can be made is desirable and there is a trade-off between the complexity of the security tag transmitter 240 and receiver circuitry within the detection equipment 120, and the range at which the signals can be received. If the range at which signals can be detected exceeds a few centimeters the method must also provide a means for detecting which of several chips within the potential reception area actually contains the security tag 100. This may involve the use of directional antennas within the detection equipment 120 or by the operator steadily decreasing the gain of the receiver (and hence the reception range) as the antenna approaches the transmitter 240.

The detection equipment 120 for detecting the radio signal from the security tag is 100 very similar to that used in the power analysis case described above. Instead of connecting a probe from the receiver to the power supply within the electronic equipment 140 containing the suspect chip 130, the receiver is connected to an antenna which is held close to the electronic equipment 140. The various techniques described above in the power analysis case: selection and amplification, mixing, CDMA coding and frequency hopping are all applicable to radio signalling as well.

In an embodiment, Ultra Wide Band (UWB) radio technology is used to build a covert channel 110 between the security tag 100 and external detection equipment 120. UWB radios spread a signal over a very wide frequency band reducing the signal energy at any particular frequency so that it falls below background noise. This makes UWB radio communication difficult to detect and jam. The pulse-based variant of UWB radio is attractive in a security tag context because it requires a relatively simple transmitter.

IP Tagging Using Signal Activity Analysis

In another embodiment information is covertly communicated from a security tag 100 included on an integrated circuit 130 by modulating the timing of edges on output pins by adding or removing a short delay. The output pins comprise the covert communications channel 110. The transmitter 240 in the security tag 100 modulates the timing of edges on the output pins (i.e. covert channel 110), to encode the security tag information using any of the coding options discussed above. As long as the edge still meets the setup constraints relative to the system clock this should have no effect on the system functionality.

IP Tagging Using Thermal Analysis

Activity in an electronic circuit results in heat being generated which in turn will raise the temperature of the chip package. In a novel embodiment a security tag 100 communicates in a covert way with an external detector 120 by employing the transmitter 240 to modulate its power consumption over time, resulting in small changes to the overall heat generated by the entire design including the IP core and the tag and hence the package temperature of the chip 130 containing the tag. A detector 120 could use an infra red sensitive camera or photodiode or another temperature measurement technology to track the temperature on the surface of the chip package and detect the covert signal. In this embodiment, the chip package itself supplies the covert communications channel 110.

There are two main problems with this technique relative to electromagnetic or power analysis techniques:
1. Chip temperature will change relatively slowly over time compared with electrical signals.
2. The contribution of the security tag 100 must be small relative to the overall power consumption of the chip 130. Customers typically seek to minimise the power consumption of their systems and may not accept a tag technology which significantly increased overall power consumption.

It is still possible to detect a signal from the security tag 100 despite these two problems but in order to separate out the tag signal from the much larger 'background noise' generated by the other circuits on the chip a large number of temperature measurements, sequenced over a relatively long time period (perhaps several hours) will be required. This will limit the scenarios in which the thermal technique could be used.

The two main advantages of the thermal technique is that since all that is required is to increase signal activity levels to generate heat the security tag 100 can be implemented with very simple circuitry. A thermal tag would be easier to 'camouflage' within a larger design than, for example, circuits designed to generate radio signals. The detector circuit 120 can also be very simple and low cost.

Use of IP Tags for Version Control and Quality Purposes

The proposed tag technology, particularly the embodiment which communicates through power supply lines, provides the ability to automatically take an inventory of every security tag 100 within a chip 130 connected to the system power bus for the electronic equipment 140. This application would require wide deployment of compliant security tags 100 which would most likely require the security tags 100 to be adopted as an industry standard. Tags could be programmed with product version information; manufacturing batch information could be included in the tag using small non-volatile memories or fuses. An engineer could determine a complete inventory of chips used in the system by simply plugging an analyser into a connector on the main power supply bus. The analyser would decode the signals generated by the tags on the power supply wiring to produce a list of tags that were present in the system. Alternatively, the analyser function could be built in to the system itself. In this case when a customer called for technical support the remote engineer could obtain data on the complete configuration of the system without needing to visit the site where the system was installed. This option would be particularly convenient if the equipment had an internet connection which could be accessed remotely by the service engineer.

The ability to rapidly and remotely determine the exact configuration of equipment owned by a particular customer could improve the quality of technical support available and reduce the need to recall equipment or send out service engineers 'just in case' where a batch of chips are known to have a defect but it is not known which customers were sold equipment containing those chips.

Most modern consumer electronics is manufactured by Original Device Manufacturer (ODM) companies in low cost areas such as China rather than by the 'brand name' which sells the equipment. Price pressure is intense and ODM companies are highly motivated to reduce the cost of the component 'bill of material'—every penny reduced from the bill of material increases their profit. Unscrupulous distributors and chip suppliers may offer ODM's 'cloned' chips (i.e. unauthorised copies of chips from reputable semiconductor companies) or even chips which failed test and were 'rescued' from the scrap bins. Such products may cause reduced reliability in the final product resulting in expense and embarrassment to the 'brand name' which subcontracted the manufacturing of its products. The IP tagging scheme disclosed here would allow a consumer electronics company to rapidly check that the products it was receiving from its ODM actually used the parts which it specified in the bill of materials provided to the ODM. The IP tagging scheme would also make it easy to determine which batches of components were causing problems should a previously reliable product start to experience quality problems.

In an embodiment the security tag circuits 100 communicate not only identification information but are also connected to error detection circuits within the 'tagged' IP core or chip design and can communicate error information along with the tag identifier. The security tags 100 can thus communicate error information directly to the detector circuit from areas of the design which would normally be inaccessible to test equipment. Preferably, the error information would be protected through encryption or the covert properties of the communications channel 110 so that it was only available to the company which included the tag 100 in their design. This scheme could greatly simplify the diagnosis of complex electronic systems which fail in the field. In an embodiment the detector circuit 120 is built in to the system and error information can be accessed by authorised engineers remotely over the internet.

As process technology improves and device feature sizes get smaller and smaller a range of 'deep sub micron' effects emerge which are likely to reduce the overall reliability and lifespan of integrated circuits. Moreover, the same trends allow more and more circuitry to be integrated on a single chip, which increases design complexity and drives the need to create designs by assembling bought-in IP cores. Programmable technologies such as FPGAs which allow design changes to be made after products are shipped are taking over more and more of the market. All the se factors make it harder to for a failure analysis engineer to determine the exact version of each chip component which has been used in a particular product. Thus, over time the need for technologies which can rapidly determine design version and manufacturing batch information and communicate error information from each chip in a system will increase.

In one embodiment each security tag 100 would contain an additional area of non-volatile memory. This memory could be programmed with a cryptographic key supplied by the company which purchased the chip and assembled it into a product. This key would be used to encrypt the signal from the security tag 100 so that only the company which assembled the product could make use of the IP core tags. This would prevent competitors using the security tags 100 to obtain a list of all the chips 130 used in the system. In another embodiment the cryptographic protocol would allow IP core vendors to detect their own tags even when this encryption was in place but not tags from other companies.

This application describes many embodiments and modes of use of a novel 'active' method of tagging intellectual property cores and complete chip designs to allow detection of copyright infringement and also automatically inventory the design revisions and manufacturing batch numbers of chips within the system. The techniques are applicable to both FPGAs and mask programmed chips. This method will protect FPGA designs even if the FPGA bitstream is encrypted to prevent any reverse engineering analysis. Unlike prior art techniques where tags are added to the integrated circuit artwork and can only be detected after the chip packaging is removed, this technique is non-invasive, quick and does not affect the functionality of the system.

While the description above contains many specific details, these should not be construed as limitations on the invention, but rather as an exemplification of preferred embodiments thereof. Many other variations would be obvious to one skilled in the art and are intended to fall within the scope of this patent.

I claim:

1. A security tag for an electronic design implemented on an integrated circuit, comprising:
   Tag data which uniquely identifies the electronic design;
   A communications channel for interfacing with an external detector, to deliver the tag data to the external detector;
   A transmitter for transmitting the tag data using a tag data signal via the communications channel to the external detector;
   A spreading circuit for spreading the tag data signal using a spreading code; and
   A ring oscillator for providing a carrier frequency and a clock signal to the spreading circuit;
   wherein the transmitter comprises a high fan out net for creating a voltage disturbance on a power supply connection, the voltage disturbance comprising the tag data and the power supply connection comprising the communications channel.

2. A security tag for an electronic design implemented on an integrated circuit, comprising:
   Tag data which uniquely identifies the electronic design;
   A communications channel for interfacing with an external detector, to deliver the tag data to the external detector;
   A transmitter for transmitting the tag data using a tag data signal via the communications channel to the external detector;
   wherein the communications channel comprises a power supply connection to a power supply pin of the integrated circuit containing the security tag; wherein the external detector is connected to the power supply pin, and wherein the transmitter is for transmitting the tag data via the power supply connection and the power supply pin to the external detector.

3. A security tag for an electronic design implemented on an integrated circuit, comprising:
   Tag data which uniquely identifies the electronic design;
   A communications channel for interfacing with an external detector, to deliver the tag data to the external detector;
   A transmitter for transmitting the tag data using a tag data signal via the communications channel to the external detector;
   wherein the communications channel comprises an output pin on the integrated circuit containing the security tag and the transmitter comprises a timing modulator for modulating timing of an edge of a signal on the output pin, the modulation of the edge being used to encode the tag data for transmission.

4. A security tag for an electronic design implemented on an integrated circuit, comprising:
   Tag data which uniquely identifies the electronic design;
   A communications channel for interfacing with an external detector, to deliver the tag data to the external detector;

A transmitter for transmitting the tag data using a tag data signal via the communications channel to the external detector;

wherein the communications channel comprises a thermal signal output from the integrated circuit containing the security tag; the external detector comprises a temperature detector; the transmitter comprises a power consumption modulator for modulating power consumption over time to generate modulations in the thermal signal output, the modulation in thermal signal output being used to encode the tag data for transmission.

* * * * *